US010063320B2

(12) United States Patent
Clark, Jr. et al.

(10) Patent No.: US 10,063,320 B2
(45) Date of Patent: Aug. 28, 2018

(54) APPARATUS AND METHOD FOR IMPLEMENTING A PHOTONIC RADIO FRONT END

(71) Applicant: The Johns Hopkins University, Baltimore, MD (US)

(72) Inventors: Thomas R. Clark, Jr., Ellicott City, MD (US); Jay H. Song, Ellicott City, MD (US); Timothy P. McKenna, Chevy Chase, MD (US); Keith G. Petrillo, Highland, MD (US); Jeffrey A. Nanzer, Columbia, MD (US); Stuart A. Jackson, Laurel, MD (US); Olukayode K. Okusaga, Germantown, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/407,859

(22) Filed: Jan. 17, 2017

(65) Prior Publication Data
US 2017/0207855 A1    Jul. 20, 2017

Related U.S. Application Data

(60) Provisional application No. 62/279,980, filed on Jan. 18, 2016.

(51) Int. Cl.
*H04B 10/2575* (2013.01)
*H04B 10/29* (2013.01)
*H04B 10/50* (2013.01)
*H04B 10/66* (2013.01)

(52) U.S. Cl.
CPC ............ *H04B 10/50* (2013.01); *H04B 10/66* (2013.01)

(58) Field of Classification Search
CPC ......................... H04B 10/2575; H04B 10/29
See application file for complete search history.

(56) References Cited

U.S. PATENT DOCUMENTS

| | | | |
|---|---|---|---|
| 2008/0212974 A1* | 9/2008 | Davies | H04B 10/2575 398/140 |
| 2017/0163347 A1* | 6/2017 | Akiyama | H04B 10/548 |

* cited by examiner

*Primary Examiner* — Shi K Li
(74) *Attorney, Agent, or Firm* — Sung T. Kim

(57) ABSTRACT

Apparatuses and methods for implementing a photonic radio front end are provided. An example apparatus may include a photonic comb filter configured to generate a photonic pulse train at a plurality of carrier frequencies, and a photonic upconverter. The photonic upconverter may be configured to receive outbound data from a data source, and encode and photomix the outbound data onto each of the carrier frequencies within the plurality of carrier frequencies to generate associated upconverted waveforms on each of the carrier frequencies. The apparatus may further comprise a transmit channel selector configured to receive the upconverted waveforms on each of the carrier frequencies, receive a control signal selecting one or more carrier frequencies for transmission of the outbound data, and filter out the upconverted waveforms at unselected carrier frequencies to provide upconverted waveforms at the selected carrier frequencies.

19 Claims, 6 Drawing Sheets

APPARATUS AND METHOD FOR IMPLEMENTING A PHOTONIC RADIO FRONT END

CROSS-REFERENCE TO RELATED APPLICATIONS

This application claims the benefit of U.S. Provisional Application No. 62/279,980 filed on Jan. 18, 2016, the entire contents of which are hereby incorporated herein by reference.

TECHNICAL FIELD

Example embodiments generally relate to communication devices and, more particularly, relate to devices for receiving and transmitting wireless signals.

BACKGROUND

Wireless communications devices often include radio frequency (RF) circuitry configured to convert the original incoming signal received at an antenna from RF to an intermediate frequency that can be analyzed to extract data from the received signal. On the other hand, RF circuitry is often employed that can encode data onto an intermediate frequency for upconversion to RF for outgoing signal transmissions. These functionalities are typically performed by circuity that is referred to as a radio front end.

A radio front end typically includes a local oscillator and a mixer to convert to or from RF. The local oscillator is often limited to a single frequency and therefore lacks flexibility with respect to receiving or transmitting signals at differing frequencies. Use of a local oscillator and a mixer, such as in conventional RF front ends, can also limit the operational bandwidth of the wireless communication device, and the tuning speed of the front end if multiple frequencies are being utilized for communications.

BRIEF SUMMARY OF SOME EXAMPLES

Accordingly, some example embodiments are directed to a radio front end that is configured to utilize, among other features, an optical or photonic comb to facilitate down sampling of inbound signals and upconversion of outbound signals.

One example embodiment is in the form of an apparatus. The example apparatus may comprise a photonic comb filter configured to generate a photonic pulse train at a plurality of carrier frequencies, and a photonic upconverter. The photonic upconverter may be configured to receive outbound data from a data source, and encode and photomix the outbound data onto each of the carrier frequencies within the plurality of carrier frequencies to generate associated upconverted waveforms on each of the carrier frequencies. The apparatus may further comprise a transmit channel selector configured to receive the upconverted waveforms on each of the carrier frequencies, receive a control signal selecting one or more carrier frequencies for transmission of the outbound data, and filter out the upconverted waveforms at unselected carrier frequencies to provide upconverted waveforms at the selected carrier frequencies. Additionally, the apparatus may comprise a transmit antenna configured to wirelessly transmit the upconverted waveforms at the selected carrier frequencies.

Another example embodiment is in the form of a communication device. The example communication device may include a photonic comb filter configured to generate an optical pulse train at a plurality of carrier frequencies, processing circuitry, and a photonic upconverter. The photonic upconverter may be configured to receive outbound data from the processing circuitry, and encode and photomix the outbound data onto each of the carrier frequencies within the plurality of carrier frequencies to generate associated upconverted waveforms on each of the carrier frequencies.

Another example embodiment is in the form of a method. The example method may comprise generating, via an photonic comb filter, an optical pulse train at a plurality of carrier frequencies, receiving, at a photonic upconverter, outbound data from a data source, and encoding and photomixing, at the photonic upconverter, the outbound data onto each of the carrier frequencies within the plurality of carrier frequencies to generate associated upconverted waveforms on each of the carrier frequencies. The example method may further comprise receiving, at a transmit channel selector, the upconverted waveforms on each of the carrier frequencies, receiving, by the transmit channel selector, a control signal selecting one or more carrier frequencies for transmission of the outbound data, filtering out, by the transmit channel selector, upconverted waveforms at unselected carrier frequencies to provide upconverted waveforms at the selected carrier frequencies, and wirelessly transmitting, via a transmit antenna, the upconverted waveforms at the selected carrier frequencies.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
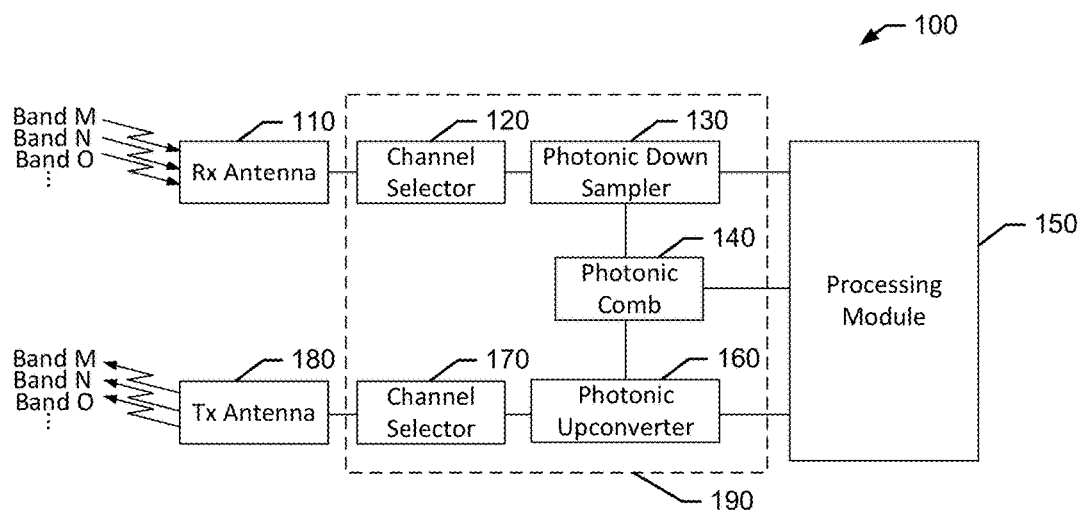
FIG. 1 shows a block diagram of a wireless communication device with a photonic radio front end according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

Example embodiments described herein leverage a photonic radio front end to realize a radio system having improved operational performance. In this regard, according to some example embodiments, a transmit and receive front end architecture may be implemented that utilizes, for example, photonic sampling and photonic comb technologies to achieve a multi-band, broadband operational bandwidth, such as for example between 1 GHz and 40 GHz. Further, rapid tuning (e.g., sub μs) for tracking and frequency inputs and wide instantaneous bandwidth for receiving and generating complex signals can be realized via some example embodiments.

Various example embodiments utilize photonic hardware in a radio front end, and more particularly, a photonic comb filter that generates a photonic pulse train at various frequencies that can be used in the down sampling and upconverting operations. The pulse train may be used to clock either or both of the transmit and receive sides of the radio front end, as well as, the analog-to-digital and digital-to-analog converters used in the signal processing. Accordingly, by leveraging a photonic comb and other photonic hardware as further described herein a high performance radio front end may be implemented.

FIG. 1 is a block diagram of an example embodiment of a wireless communications device 100 that includes a photonic radio front end 190. In this regard, the wireless communications device 100 comprises the photonic radio front end 190, a receive (Rx) antenna 110, a transmit (Tx) antenna 180, and processing module 150. The receive antenna 110 and the transmit antenna 180 each may be a single broadband antenna or, according to some example embodiments, a collection of multiplexed antennas. In this regard, the receive antenna 110 and the transmit antenna 180 may be configured to receive RF signals at a plurality of carrier frequencies or on a plurality of bands. As shown in FIG. 1, receive antenna 110 and transmit antenna 180 may be configured to receive or transmit signals on example Bands M, N, and O, respectively. Further, processing module 150 may be hardware configured, software configured, or a combination of hardware and software configured to perform functionalities associated with the operation of a radio front end (e.g., radio front end 190). Further, processing module 150 may be the same or similar to the module 400 as further described with respect to FIG. 4.

The radio front end 190 may include a plurality of sub-components and devices including but not limited to channel selectors 120, 170, a photonic down sampler 130, a photonic comb 140, and a photonic upconverter 160. With respect to operation of the radio front end 190 on the receive side (which may comprise the channel selector 120, the photonic down sampler 130, and the photonic comb 140), inbound wireless signals received by the receive antenna 110 may be provided to the radio front end 190 for conversion to an intermediate or baseband frequency for data extraction by the processing module 150. In this regard, the receive side of the radio front end 190 may operate as a Nyquist-folding and selecting receiver that can operate in the range of DC (direct current) to, for example, 50 GHz of bandwidth. Additionally, with respect to the transmit side, data provided by the processing module 150 may be upconverted and provided to the transmit antenna 180 for wireless transmission as an outbound signal. In this regard, the transmit side may leverage photonic upconversion covering DC to, for example, 50 GHz of bandwidth. According to some example embodiments, the receive and transmit sides of the radio front end 190 may be locked to a common time base by a photonic comb input as further described below.

More specifically the receive side of the radio front end 190 may include the channel selector 120, the photonic down sampler 130, and the photonic comb 140. Signals received by the receive antenna 110 may be passed to the channel selector 120 (or the receive channel selector). In this regard, the receive antenna 110 may be configured to receive an inbound signal having an inbound carrier signal and an inbound encoded waveform. The channel selector 120 may be configured to receive a selection, for example in the form of a signal, from the processing module 150 or from other circuitry. The selection may indicate a channel, band, or frequency and cause the channel selector 120 to be tuned to the particular channel, band, or frequency of interest included in the inbound signal received by the receive antenna 110. In this regard, the channel selector 120 may filter the inbound signal such that, for example, one or more carrier frequencies of interest are passed to the photonic down sampler 130 with their respective encoded data. Similarly, the channel selector 120 may be configured to filter select carrier frequencies out of the inbound signal received by the receive antenna 110. To perform these functionalities, according to some example embodiments, the channel selector 120 may be a tunable, band pass filter. In this regard, the channel selector 120 may be a fast tunable band pass filter capable, for example, of full band tuning in approximately 100 ns. As such, the channel selector 120 may facilitate the ability to have full broadband coverage without channelization or cavity tuning or an associated recovery time for such approaches that would inhibit performance. According to some example embodiments, the channel selector 120 may be the only tunable device on the receive side of the radio front end 190. According to some example embodiments, the channel selector 120 may include or work in association with an amplifier to amplify the filtered signal before providing the signal to the photonic down sampler 130.

The filtered inbound signal from the channel selector 120 may be received by the photonic down sampler 130. According to some example embodiments, the receive antenna 110 may be configured to receive the inbound signal and pass the signal directly to the photonic down sampler 130 for sampling. Regardless of source of the inbound signal, the photonic down sampler 130 may be configured to sample the inbound signal, which may be the entire signal received by the antenna or a filtered portion of the signal received at the antenna, at a rate based on a signal, which may be in the form of a plurality of signals, provided by the photonic comb 140. In this regard, the photonic comb 140 may provide an optical pulse train to the photonic down sampler 130 that may be used for sample triggering by the photonic down sampler 130 thereby setting a bandwidth of operation and a sampling aperture performance. According to some example embodiments, the optical pulse train may be provided continuously to the photonic downsampler 130 and each frequency in the optical pulse train provided by the photonic comb 140 to the photonic downsampler 130 may be separately provided on a line, lead, trace, or pin that may be dedicated for that frequency. The optical pulse train signal may include pulses at a plurality of frequencies that may be multiples of a base frequency to thereby support sampling at the various carrier frequencies. In this regard, the photonic down sampler 130 may operate as, and be embodied at least in part by, an opto-electronic modulator driven by the optical pulse train of the photonic comb 140. Accordingly, the photonic down sampler 130 may be configured to sample the received signal down to a baseband signal or signals (or to an intermediate frequency signal) using each of a plurality of carrier frequencies provided by the optical pulse train provided by the photonic comb 140. The photonic down sampler 130 may also be configured to provide each of the baseband signals to the processing module 150 to permit the encoded, inbound data to be extracted by the processing module 150. To perform the data decoding and extraction, the processing module 150 may employ an optically triggered analog-to-digital converter (ADC) that, according to some example embodiments, may be triggered or clocked by the same optical pulse train provided by the photonic comb 140.

As mentioned above, according to some example embodiments, the optical pulse train provided by the photonic comb 140 and the operation of photonic down sampler 130 may dictate the bandwidth and sampling aperture performance of the receive side of the radio front end 190. In this regard, a uniform down sampling architecture can be utilized based on precision photonic sampling using the pulse train, which may be low-jitter picosecond pulses. The photonic down sampler 130 may employ an opto-electronic modulator (e.g., a Mach-Zehnder modulator) that samples the received signal with a sampling resolution performance matched to an ADC (e.g., a high resolution baseband ADC) that may be synchronously clocked with the photonic down sampler 130. Accordingly, the carrier signal and the encoded waveform may be aliased with high efficiency and fidelity to a baseband signal at less than half the ADC sample rate-a Nyquist band. As such, a single clock signal provided by the photonic comb 140 at the sample rate of the ADC and a channel selector 120 employing tunable filter may be utilized to select the Nyquist band that is to be down sampled and digitized in the ADC baseband for further analysis by the processing module 150 to decode the signal. According to some example embodiments, the channel selector 120 and its filter may be the sole tuned component on the receive side of the radio front end 190, and the photonic down sampler 130 and the photonic comb 140 may be operated in a steady state regime ensuring high performance and low to zero settling time operation.

Figure 3:
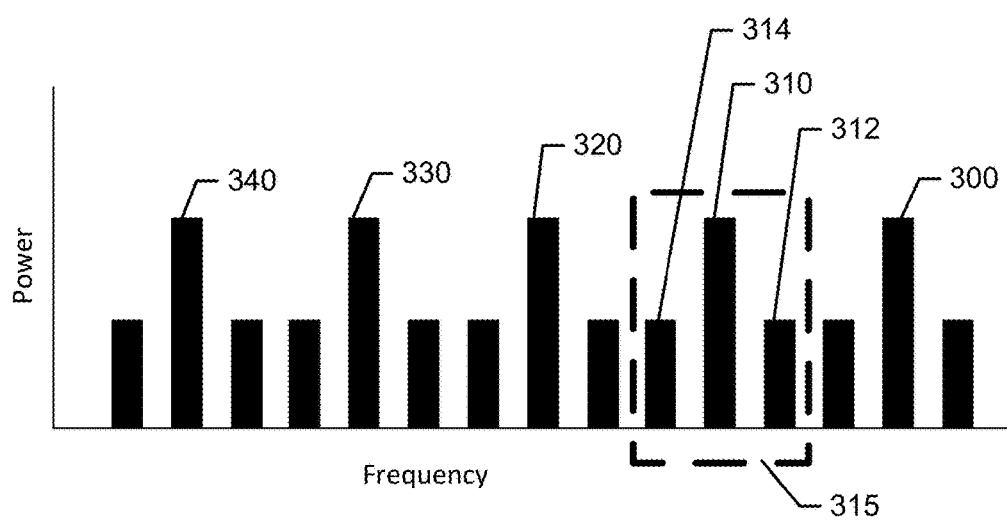
FIG. 3 shows a chart of carrier frequencies in the frequency domain with encoded data according to an example embodiment.

The operation of the transmit side of the radio front end 190 may also utilize the optical pulse train provided by the photonic comb 140 to encode data onto one or more carriers for outbound transmission via the transmit antenna 180. In this regard, the processing module 150 may include or implement a digital-to-analog converter (DAC) triggered or clocked by the optical pulse train provided by the photonic comb 140 to encode outbound data onto a signal at baseband or an intermediate frequency. The outbound data encoded signal may be upconverted onto a number of carrier signals based on the optical pulse train provided to the photonic upconverter 160. In this regard, according to some example embodiments, the optical pulse train may be provided to the photonic upconverter 160 continuously and each frequency in the optical pulse train provided by the photonic comb 140 to the photonic upconverter 160 may be separately provided on a line, lead, trace, or pin that may be dedicated for that frequency. The photonic upconverter 160, utilizing, for example, an electro-optic modulator, may be configured to receive outbound data from a data source, such as, for example, the processing module 150. The photonic upconverter 160 may also encode and photomix the outbound data onto each of the carrier frequencies associated with the optical pulse train provided by the photonic comb 140. According to some example embodiments, the encoding and photomixing may be performed on all carrier frequencies that are defined by the pulse train of the photonic comb 140, and no selection of the carrier and time delay associated with such an approach is necessary. The output signal of the photonic upconverter 160, in this regard, is depicted in FIG. 3, which shows a plurality of carrier frequencies with data encoded side bands. Data has been encoded and photomixed onto carrier frequencies 300, 310, 320, 330, and 340 with the data being included in each of the carrier's respective side bands. As such, the photonic upconverter 160 may employ, for example, an electro-optic modulator and a photodide to encode and photomix the outbound data onto each of the carriers. According to some example embodiments, the photonic upconverter 160 may utilize digital transfer function inversion linearization to reduce harmonics. The result may be a plurality of upconverted waveforms on each of the carrier frequencies.

The signals associated with the upconverted data on a plurality of carrier frequencies as shown in FIG. 3 may be provided to and received by the channel selector 170 (or transmit channel selector) where a selection of the desired carriers can be made. The channel selector 170 may be the same (matched) or similar to the channel selector 120 and may be configured to receive a selection, for example in the form of a control signal, from the processing module 150 or from other circuitry. The selection may indicate a channel, band, or frequency and cause the channel selector 170 to be tuned to a particular channel, band, or frequency of interest included in the outbound signal to be transmitted by the transmit antenna 180. Referring again to FIG. 3, an example selection 315 of carrier frequency 310 and its side bands 312 and 314 may be made, thereby causing the channel selector to filter the other carrier frequencies and their associated side bands. In this regard, the channel selector 170 may receive the upcoverted waveforms on each of the carrier frequencies of the optical pulse train and filter the outbound signal such that, for example, one or more carrier frequencies of interest are passed to the transmit antenna 180 for transmission at that respective frequency. In other words, according to some example embodiments, the channel selector 170 may be configured to filter out the upconverted waveforms at unselected carrier frequencies to thereby provide upconverted waveforms at unselected carrier frequencies for transmission of the outbound data. Similarly, the channel selector 170 may be configured to filter out select carrier frequencies from the upconverted signal. To perform these functionalities, according to some example embodiments, the channel selector 170 may be a tunable, band pass filter. In this regard, the channel selector 170 may be a fast tunable band pass filter capable, for example, of full band tuning in approximately 100 ns. As such, the channel selector 170 may facilitate the ability to have full broadband outbound transmission without channelization or cavity tuning or an associated recovery time that can inhibit performance. According to some example embodiments, the channel selector 170 may be the only tunable device on the transmit side of the radio front end 190. Accordingly, based on the selection of desirable channels, bands, or frequencies, a filtered outbound signal may be provided by the channel selector 170 to the transmit antenna 180 wireless transmission at the one or more selected carrier frequencies. In this regard, the transmit antenna 180 may be configured to wirelessly transmit the upcoverted waveforms at the selected carrier frequencies.

According to some example embodiments, the transmit side of the radio front end 190 may operate in an analogous manner to the receive side. The photonic comb 140 may provide a static, always-available optical pulse train spaced at a clock frequency and spanning a frequency range from the clock frequency to well beyond the desired bandwidth of the system. As mentioned above, the optical pulse train may be shared and thereby facilitate synchronous operation with the ADC that supports the receive side and the DAC that supports the transmit side. The photonic upconverter 160 employing an electro-optic modulator of bandwidth higher than the DAC's output waveform bandwidth may encode the outbound data onto one or many of the photonic comb lines (and the associated carrier frequencies) and photo-mix the photonic comb lines via a photodiode. As a result, the upconversion of the waveform to many carrier frequencies determined by the comb line pairings may be implemented. As such, an always-available set of waveform copies on multiple different carriers, possibly over the entire operating bandwidth of the photodiode, may be generated.

According to some example embodiments, the upconversion and channel selection may be performed in the absence of conventional RF mixers or local oscillators. Accordingly, the implementation of the transmit side of radio front end 190 may have advantages in terms of dynamic range performance, frequency tuning range, and tuning speed and simultaneous multiple band support relative to conventional techniques that employ RF mixers and local oscillators. In addition, according to some example embodiments, the potential for significant physical advantages may be realized due to, for example, fiber-optic transport of the signals in the path between the transmit antenna 180 and the processing module 150 thereby providing low-loss, high-bandwidth, and electro-magnetic, interference-free transport within a constrained size, weight, and power form factor device.

Figure 2:
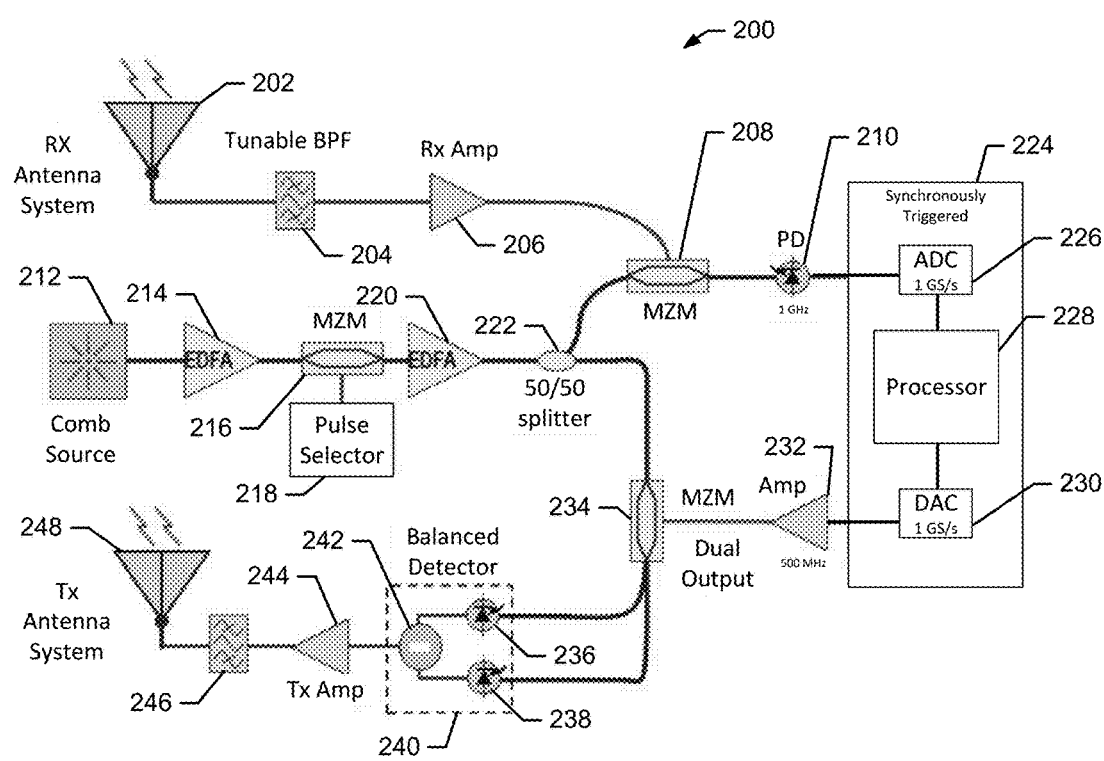
FIG. 2 shows an example implementation of a wireless communication device with a photonic radio front end according to an example embodiment.

FIG. 2 illustrates one detailed example implementation of a radio system 200 including a radio front end in accordance with some example embodiments. On the receive side, a receive antenna system 202 (the same or similar to receive antenna 110) may be configured to receive wireless RF signals to be passed to the tunable band pass filter (BPF) 204. The tunable band pass filter 204 may be configured to operate in the same or similar manner to the channel selector 120. The signal from the tunable BPF 204 may be amplified by receive amplifier 206 and then provided to an optoelectric modulator that operates the same or similar to the photonic down sampler 130, and comprises a Mach-Zehnder modulator (MZM) 208 and a photodiode 210. The MZM 208 may be triggered or clocked by a signal originating at the comb source 212.

The comb source 212 may be configured to generate optical pulse train signals that are conditioned for use as a triggering or clocking signal for other components within the radio system 200. The output signal of the comb source 212 may be boosted or amplified by the amplifier 214, which may be a erbium-doped fiber amplifier (EDFA). The pulse selector 218, which according to some example embodiments may be controlled by processing module 224, may be configured to select the frequencies of the pulse train to be provided to the other components. The pulse selector signal 218 may be configured to allow any number of optical pulses to pass the MZM 216 with a drive signal synchronous to the output of the comb source 212, which may include providing a high voltage to the MZM 216 to provide full transmission for each desired pulse and a low voltage to the MZM 216 to provide relatively large attenuation for each undesired pulse. In one example embodiment, the signal from the pulse selector 218 may be a set of square pulses at a rate N times lower than the comb source repetition rate R, where N is an integer evenly divided into R. The resultant signal from the MZM 216 may again be amplified by EDFA 220 and passed to a splitter 222 (e.g., a 50/50 splitter). The optical signal provided by the splitter 222 may be used by the MZM 208 to down sample the electrical signal that was received by the receive antenna 202 and conditioned as described above. The photodiode 210 can operate to convert the optical output of the MZM 208 into an electrical signal that can be analog-to-digital converted by a synchronously triggered ADC 226 in preparation for data extraction by the processor 228. In this regard, the ADC 226, the processor 228, and the DAC 230 may be hardware or software configured components of processing module 224 that may be synchronously clocked or triggered based on the optical pulse train provided by the comb source 212 and implemented in a chip or common housing. In this regard, the processing module 224 may be configured to perform the features of the processing module 150 described with respect to FIG. 1.

On the transmit side, the processor 228 may be configured to provide data (e.g., in the form of a digital signal) to the DAC 230 for conversion. The electrical signal may be amplified by the amplifier 232 and provided to the MZM 234 for upconversion based on the conditioned signal provided by the comb source 212. In this regard, similar to the photonic upconverter 160, the MZM 234 may be configured to upconvert the data to a plurality of carrier frequencies. The signals may then be provided to a balanced detector 240 via a dual output to the MZM 234. The balanced detector 240 may comprise photodiodes 236 and 238, and a comparator 242. The balanced detector may operate to convert the optical input signal into an electrical signal and also eliminate common noise introduced or otherwise present during the conversion. According to some example embodiments, rather than the balanced detector 240, a single photodiode may be utilized, however, noise in the signal may be increased relative to an implementation using a balanced detector. The electrical output of the balanced detector may be amplified via amplifier 244 and then passed to a tunable BPF 246 that operates the same or similar to the channel selector 170. The filtered signal may then be provided to the transmit antenna system 248 for wireless radio transmission.

Figure 4:
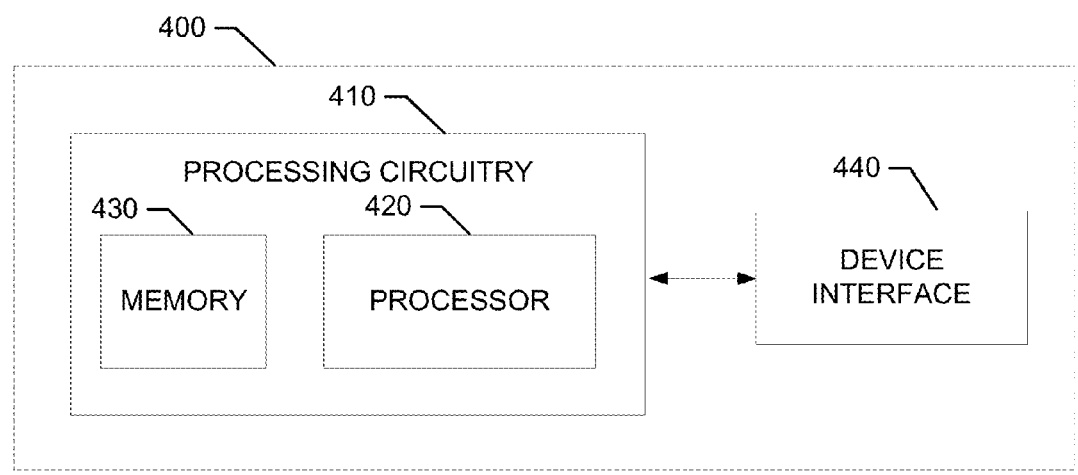
FIG. 4 illustrates a block diagram of a processing module of a wireless communication device according to an example embodiment.

As mentioned above, the processing module 150 (and similarly the processing module 224) may be configured to interface with the radio front end 190 to perform the operations described herein. As such, the processing module 150, which may embody and implement ADCs and DACs among other components, may operate under computer control, or at least under the control of a processing circuitry that support the operation of the radio front end 190 as described above. FIG. 4 illustrates a block diagram of one instance of a processing module 400 according to an example embodiment that may be embodied as or configured to perform the operations of the processing modules 150 and 224 described above.

As shown in FIG. 4, the processing module 400 may include or otherwise be in communication with processing circuitry 410 that is configurable to perform actions in accordance with example embodiments described herein. As such, for example, the functions attributable to the processing modules 150 and 224 may be carried out by the processing circuitry 410.

The processing circuitry 410 may be configured to perform data processing, control function execution or other processing and management services according to an example embodiment. In some embodiments, the processing circuitry 410 may be embodied as a chip or chip set. In other words, the processing circuitry 410 may comprise one or more physical packages (e.g., chips) including materials, components or wires on a structural assembly (e.g., a baseboard). The processing circuitry 410 may be configured to encode into, and decode data from, a signal.

In an example embodiment, the processing circuitry 410 may include one or more instances of a processor 420 and memory 430 that may be in communication with or otherwise control a device interface 440. As such, the processing circuitry 410 may be embodied as a circuit chip (e.g., an integrated circuit chip) configured (e.g., with hardware, software or a combination of hardware and software) to perform operations described herein.

The device interface 440 may include one or more interface mechanisms for enabling communication with other devices, such as, for example, a radio front end. In some cases, the device interface 440 may be any means such as a device or circuitry embodied in either hardware, or a combination of hardware and software that is configured to receive or transmit data from/to devices in communication with the processing circuitry 410.

In an exemplary embodiment, the memory 430 may include one or more non-transitory memory devices such as, for example, volatile or non-volatile memory that may be either fixed or removable. The memory 430 may be configured to store information, data, applications, instructions or the like for enabling the processing module 400 to carry out various functions in accordance with exemplary embodiments of the present invention. For example, the memory 430 could be configured to buffer input data for processing by the processor 420. Additionally or alternatively, the memory 430 could be configured to store instructions for execution by the processor 420. As yet another alternative, the memory 430 may include instructions for implementing a DAC or ADC. Among the contents of the memory 430, applications may be stored for execution by the processor 420 in order to carry out the functionality associated with each respective application. In some cases, the applications may include directions for control of the radio front end 190 or the components thereof to support inbound and outbound wireless communications.

The processor 420 may be embodied in a number of different ways. For example, the processor 420 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 420 may be configured to execute instructions stored in the memory 430 or otherwise accessible to the processor 420. As such, whether configured by hardware or by a combination of hardware and software, the processor 420 may represent an entity (e.g., physically embodied in circuitry—in the form of processing circuitry 410) capable of performing operations according to embodiments of the present invention while configured accordingly. Thus, for example, when the processor 420 is embodied as an ASIC, FPGA or the like, the processor 420 may be specifically configured hardware for conducting the operations described herein. Alternatively, as another example, when the processor 420 is embodied as an executor of software instructions, the instructions may specifically configure the processor 420 to perform the operations described herein.

In an example embodiment, the processor 420 (or the processing circuitry 410) may be embodied as, include or otherwise control a radio front end, such as radio front end 190. As such, in some embodiments, the processor 420 (or the processing circuitry 410) may be said to cause each of the operations described in connection with the radio front end 190 by directing the radio front end 190 to undertake the corresponding functionalities responsive to execution of instructions or algorithms configuring the processor 420 (or processing circuitry 410) accordingly. For example, the processor 420 may provide programmable control signals, selections, and the like to control the operation of a radio front end responsive to execution of instructions stored in the memory 430.

Figure 5:
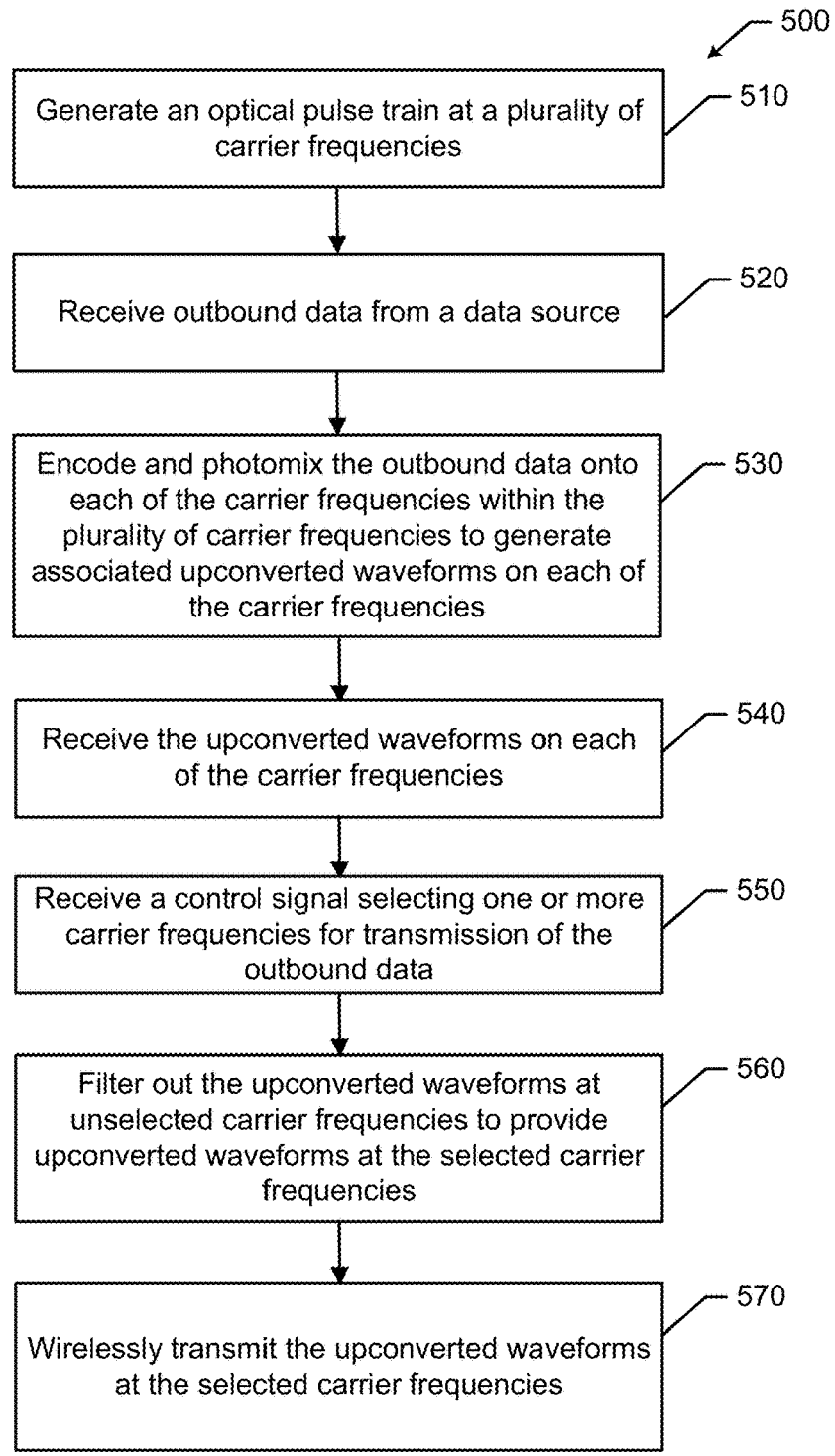
FIG. 5 illustrates a flow chart of a method for upconverting an outbound data signal for transmission according to an example embodiment.

Referring now to FIG. 5, a block diagram 500 of an example method for operating a wireless communications device and a radio front end, such as radio front end 190, to generate a wireless data transmission is provided. In this regard, the example method may comprise generating, via an photonic comb filter, an optical pulse train at a plurality of carrier frequencies at 510, and receiving, at a photonic upconverter, outbound data from a data source at 520. According to some example embodiments, the outbound data may be received by the photonic upconverter via a digital-to-analog converter that is clocked by the photonic comb filter. Further, the example method may include, at 530, encoding and photomixing the outbound data onto each of the carrier frequencies, via the photonic upconverter, within the plurality of carrier frequencies to generate associated upconverted waveforms on each of the carrier frequencies. At 540, the example method may further include receiving, at a transmit channel selector, the upconverted waveforms on each of the carrier frequencies. At 550, the example method may include receiving, by the transmit channel selector, a control signal selecting one or more carrier frequencies for transmission of the outbound data; and at 560, filtering out the upconverted waveforms at unselected carrier frequencies to provide upconverted waveforms at the selected carrier frequencies. Finally, at 570, the example method may include wirelessly transmitting, via a transmit antenna, the upconverted waveforms at the selected carrier frequencies.

Figure 6:
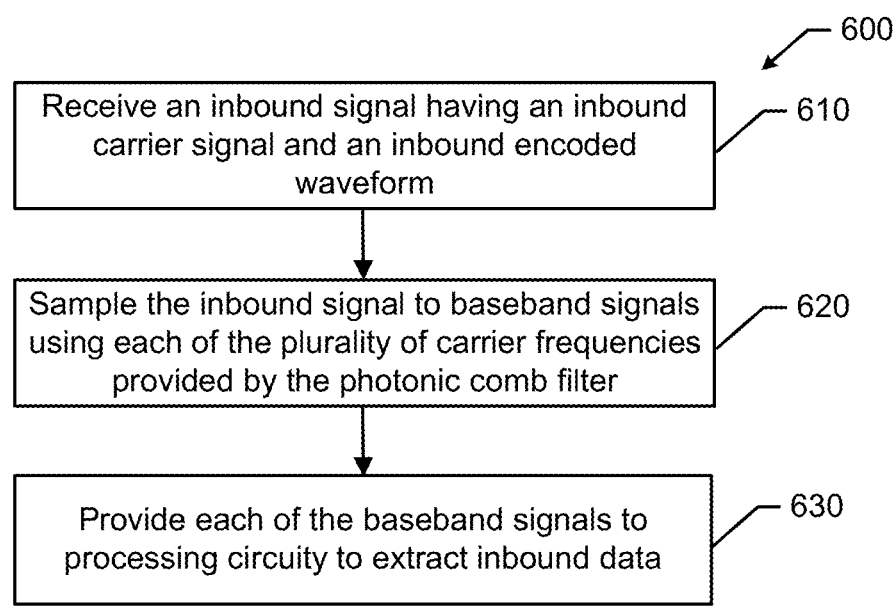
FIG. 6 illustrates a flow chart of a method for down sampling an inbound wireless signal for data extraction according to an example embodiment.

Referring now to FIG. 6, a block diagram 600 of an example method for operating a wireless communications device and a radio front end, such as radio front end 190, to receive a wireless data transmission is provided. In this regard, the example method may comprise receiving, via a receive antenna, an inbound signal having an inbound carrier signal and an inbound encoded waveform at 610. Further, the example method may include, at 620, sampling, via a photonic down sampler, the inbound signal to baseband signals using each of the plurality of carrier frequencies provided by the photonic comb filter, and, at 630, providing each of the baseband signals to the processing circuity to extract inbound data. According to some example embodiments, the inbound data may be extracted via an analog-to-digital converter clocked by the photonic comb filter.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising:
   a photonic comb filter configured to generate a photonic pulse train at a plurality of carrier frequencies;
   a photonic upconverter configured to:
     receive outbound data from a data source, and
     encode and photomix the outbound data onto each of the carrier frequencies within the plurality of carrier frequencies to generate associated upconverted waveforms on each of the carrier frequencies;
   a transmit channel selector configured to:
     receive the upconverted waveforms on each of the carrier frequencies;
     receive a control signal selecting one or more carrier frequencies for transmission of the outbound data; and
     filter out the upconverted waveforms at unselected carrier frequencies to provide upconverted waveforms at the selected carrier frequencies; and
   a transmit antenna configured to wirelessly transmit the upconverted waveforms at the selected carrier frequencies.

2. The apparatus of claim 1, further comprising processing circuitry configured to provide the outbound data to the photonic upconverter via a digital-to-analog converter that is clocked by the photonic comb filter.

3. The apparatus of claim 1, wherein the photonic upconverter is configured to employ an electro-optic modulator and a photodiode to encode and photomix the outbound data onto each of the carrier frequencies within the plurality of carrier frequencies.

4. The apparatus of claim 3, wherein the electro-optic modulator is further configured to eliminate harmonics in the upconverted waveforms using digital transfer function inversion linearization.

5. The apparatus of claim 1, wherein the transmit channel selector includes a tunable band pass filter.

6. The apparatus of claim 1, further comprising:
   processing circuitry;
   a receive antenna configured to receive an inbound signal having an inbound carrier signal and an inbound encoded waveform;
   a photonic down sampler configured to:
     sample the inbound signal to baseband signals using each of the plurality of carrier frequencies provided by the photonic comb filter, and
     provide each of the baseband signals to the processing circuity to extract inbound data.

7. The apparatus of claim 6, wherein the processing circuitry employs an analog-to-digital converter to extract the inbound data, and wherein the analog-to-digital converter is clocked by the photonic comb filter.

8. The apparatus of claim 6, further comprising a receive channel selector configured to filter select carrier frequencies out of the inbound signal.

9. A communication device comprising:
   a photonic comb filter configured to generate an optical pulse train at a plurality of carrier frequencies;
   processing circuitry; and
   a photonic upconverter configured to:
     receive outbound data from the processing circuitry via a digital-to-analog converter that is clocked by the photonic comb filter, and
     encode and photomix the outbound data onto each of the carrier frequencies within the plurality of carrier frequencies to generate associated upconverted waveforms on each of the carrier frequencies.

10. The communication device of claim 9, wherein the photonic upconverter is configured to employ an electro-optic modulator and a photodiode to encode and photomix the outbound data onto each of the carrier frequencies within the plurality of carrier frequencies.

11. The communication device of claim 9 further comprising:
    a transmit channel selector configured to:
      receive the upconverted waveforms on each of the carrier frequencies;
      receive, from the processing circuitry, a control signal selecting one or more carrier frequencies for transmission of the outbound data; and
      filter out the upconverted waveforms at unselected carrier frequencies to provide upconverted waveforms at the selected carrier frequencies; and a transmit antenna configured to wirelessly transmit the upconverted waveforms at the selected carrier frequencies.

12. The communication device of claim 11, wherein the transmit channel selector includes a tunable band pass filter.

13. The communication device of claim 9, further comprising a photonic down sampler configured to:
sample an inbound signal to baseband signals using each of the plurality of carrier frequencies provided by the photonic comb filter, and
provide each of the baseband signals to the processing circuity to extract inbound data.

14. The communication device of claim 13, wherein the processing circuitry employs an analog-to-digital converter to extract the inbound data, and wherein the analog-to-digital converter is clocked by the photonic comb filter.

15. The communication device of claim 13, further comprising a receive channel selector configured to filter select carrier frequencies out of the inbound signal.

16. A method comprising:
generating, via an photonic comb filter, an optical pulse train at a plurality of carrier frequencies;
receiving, at a photonic upconverter, outbound data from a data source;
encoding and photomixing, at the photonic upconverter, the outbound data onto each of the carrier frequencies within the plurality of carrier frequencies to generate associated upconverted waveforms on each of the carrier frequencies;
receiving, at a transmit channel selector, the upconverted waveforms on each of the carrier frequencies;
receiving, by the transmit channel selector, a control signal selecting one or more carrier frequencies for transmission of the outbound data;
filtering out, by the transmit channel selector, upconverted waveforms at unselected carrier frequencies to provide upconverted waveforms at the selected carrier frequencies; and
wirelessly transmitting, via a transmit antenna, the upconverted waveforms at the selected carrier frequencies.

17. The method of claim 16, further comprising providing the outbound data to the photonic upconverter via a digital-to-analog converter that is clocked by the photonic comb filter.

18. The method of claim 17, further comprising:
receiving, via a receive antenna, an inbound signal having an inbound carrier signal and an inbound encoded waveform;
sampling, via a photonic down sampler, the inbound signal to baseband signals using each of the plurality of carrier frequencies provided by the photonic comb filter; and
providing each of the baseband signals to the processing circuity to extract inbound data.

19. The method of claim 18, further comprising extracting the inbound data via an analog-to-digital converter clocked by the photonic comb filter.

* * * * *